United States Patent
MacDonald et al.

(10) Patent No.: US 12,382,977 B2
(45) Date of Patent: *Aug. 12, 2025

(54) COLORED FOODSTUFF HAVING A LOW PH

(71) Applicant: GNT GROUP B.V., Mierlo (NL)

(72) Inventors: Jane Lee MacDonald, New York, NY (US); Elena Leeb, Aachen (DE); Christina Niehoff, Aachen (DE); Clemens Birla, Aachen (DE)

(73) Assignee: GNT GROUP B.V., Mierlo (NL)

( * ) Notice: Subject to any disclaimer, the term of this patent is extended or adjusted under 35 U.S.C. 154(b) by 219 days.

This patent is subject to a terminal disclaimer.

(21) Appl. No.: 17/423,525

(22) PCT Filed: Nov. 19, 2019

(86) PCT No.: PCT/EP2019/081790
§ 371 (c)(1),
(2) Date: Jul. 16, 2021

(87) PCT Pub. No.: WO2020/148002
PCT Pub. Date: Jul. 23, 2020

(65) Prior Publication Data
US 2022/0039435 A1 Feb. 10, 2022

Related U.S. Application Data

(60) Provisional application No. 62/794,104, filed on Jan. 18, 2019, provisional application No. 62/794,083, (Continued)

(30) Foreign Application Priority Data

Feb. 11, 2019 (EP) .................................. 19156394
Feb. 11, 2019 (EP) .................................. 19156427
(Continued)

(51) Int. Cl.
*A23L 2/58* (2006.01)
*A23B 70/10* (2025.01)
(Continued)

(52) U.S. Cl.
CPC ................. *A23L 2/58* (2013.01); *A23B 70/10* (2025.01); *A23B 70/30* (2025.01); *A23L 2/02* (2013.01);
(Continued)

(58) Field of Classification Search
CPC ....................................................... A23L 5/46
See application file for complete search history.

(56) References Cited

U.S. PATENT DOCUMENTS 3,378,541 A * 4/1968 Colquhoun ......... C08B 37/0042
536/114
4,650,683 A * 3/1987 Guittard .................... A23L 9/12
426/103
(Continued)

FOREIGN PATENT DOCUMENTS

WO 2018134390 A1 7/2018

OTHER PUBLICATIONS

Pecquet et al. (WO 2018/229365) Machine Translation 9 pages (Year: 2018).*

(Continued)

*Primary Examiner* — Felicia C Turner
(74) *Attorney, Agent, or Firm* — Hudak, Shunk & Farine Co. LPA (57) ABSTRACT

A foodstuff, including a. a spirulina-extract having phycocyanin, b. at least one multi-sulphated carrageenan and c. water, wherein the amount of multi-sulphated carrageenan is between 0.006 and 0.6 wt. %, wherein the amount of phycocyanin ranges between 0.003 and 0.5 wt. %, wherein the amount of water ranges between 15 and 80 wt. %, and
(Continued)

wherein d. when the foodstuff contains at least 45 and at most 80 wt. % water, the weight ratio between multi-sulphated carrageenan and phycocyanin ranges between 2:1 and 150:1, and the pH of the foodstuff ranges between 2.0-3.7 or e. when the foodstuff contains at least 15 and less than 45 wt. % water, i. the weight ratio between multi-sulphated carrageenan and phycocyanin ranges between 1.5:1 and 100:1 at a pH of at least 2 and less than 2.5, ii. the weight ratio between multi-sulphated carrageenan and phycocyanin ranges between 0.7:1 and 75:1 at a pH of at least 2.5 and less than 2.9, and iii. the weight ratio between multi-sulphated carrageenan and phycocyanin ranges between 0.4:1 and 50:1 at a pH of at least 2.9 and less than 5, and wherein the wt. % are relative to the total weight of the foodstuff.

15 Claims, 1 Drawing Sheet

Related U.S. Application Data filed on Jan. 18, 2019, provisional application No. 62/794,094, filed on Jan. 18, 2019, provisional application No. 62/794,074, filed on Jan. 18, 2019.

(30) Foreign Application Priority Data

Feb. 11, 2019 (EP) .................................. 19156440
Feb. 11, 2019 (EP) .................................. 19156444

(51) Int. Cl.

| | | |
|---|---|---|
| *A23B 70/30* | (2025.01) | |
| *A23L 2/02* | (2006.01) | |
| *A23L 2/68* | (2006.01) | |
| *A23L 2/84* | (2006.01) | |
| *A23L 5/46* | (2016.01) | |
| *A23L 29/231* | (2016.01) | |
| *A23L 29/256* | (2016.01) | |
| *C12G 3/04* | (2019.01) | |

(52) U.S. Cl.
CPC ........ *A23L 2/68* (2013.01); *A23L 2/84* (2013.01); *A23L 5/46* (2016.08); *A23L 29/231* (2016.08); *A23L 29/256* (2016.08); *C12G 3/04* (2013.01); *A23V 2002/00* (2013.01)

(56) References Cited

U.S. PATENT DOCUMENTS

| | | |
|---|---|---|
| 2011/0070336 A1 | 3/2011 | Mutilangi et al. |
| 2012/0328760 A1* | 12/2012 | Harada .................... A23D 7/02 426/648 |
| 2015/0201635 A1 | 7/2015 | Graf et al. |
| 2016/0000123 A1* | 1/2016 | Sher ........................ A23C 9/156 426/584 |
| 2016/0324745 A1* | 11/2016 | Helgason .............. A23K 20/179 |
| 2018/0192677 A1* | 7/2018 | Martin .................... A23G 4/068 |
| 2018/0271119 A1 | 9/2018 | Cagnac |

OTHER PUBLICATIONS

Selig Michael J et al: "Protection of blue color in a spirulina derived physocyanin extract from proteolytic and thermal degradation via complexation with beet-pectin", Food Hydrocolloids, Jul. 28, 2017, pp. 46-52, vol. 74, Elsevier BV, NL.

Eko Nuracahya et al: "Physical Properties of Spirulina Phycocyanin Microencapsulated with Maltodextrin and Carrageenan", Philippine Journal of Science, Jun. 1, 2018, pp. 201-207, vol. 147, Philippines.

Ratana Chaiklahan et al: "Stability of phycocyanin extracted from *Spirulina* sp: Influence of temperature, PH and preservatives", Process Biochemistry, Apr. 1, 2012, pp. 659-664, vol. 47, No. 4, Elsevier Ltd.

Giulia Martelli et al: "Thermal stability improvement of blue colorant C-phycocyanin from Spirulina platensis for food industry applications", Process Biochemistry, Jan. 1, 2014, pp. 154-159, vol. 49 No. 1, Elsevier Ltd.

Prajapati Vipul D et al: "Carrageenan: A natural seaweed polysaccharide and its applications", Carbohydrate Polymers, Jan. 30, 2014, pp. 97-112, vol. 105, Elsevier Ltd.

Jespersen et al: "Heat and light stability of three natural blue colorants for use in confectionery and beverages", European Food Research and Technology, Springer Berlin Heidelberg, Mar. 1, 2005, pp. 261-266 vol. 220, No. 3-4, Springer-Verlag.

Sonda Benelhadj et al: "Effect of pH on the functional properties of Arthrospira (Spirulina) platensis protein solate", Food Chemistry, Aug. 31, 2015, pp. 1056-1063, vol. 194, Elsevier Ltd.

Dewi et al:"Physical Characteristics of Phycocyanin from Spirulina Microcapsules using Different Coating Materials with Freeze Drying Method", 2nd Int'l Conf. Tropical and Coastal Region Eco Dev., 2016, IOP Conf Series: Earth and Envirn. Sci 55, 2017, 012060, IOP Publishing Ltd.

Buchweitz, "Natural Solutions for Blue Colors in Food", Handbook on Natural Pigments in Food and Beverages, 2016, pp. 355-384, vol. 17, Woodhead Publishing.

Patino, "Protein-polysaccharide interactions at fluid interfaces" Food Hydrocolloids, 2011, pp. 1925-1937, vol. 25, Elsevier Ltd.

Singh, "Kinetics of acid hydrolysis of κ-carrageenan as determined by molecular weight (SEC-MALLSRI), gel breaking strength, and viscosity measurements", Carbohydrate Polymers, 1994, pp. 89-103, vol. 23, Elsevier Science imited.

Yoshikawa, "Single-Laboratory Validation of a Method for the Determination of c-Phycocyanin and Allophycocyanin in Spirulina (Arthrospira) Supplements and Raw Materials by Spectrophotometry", Journal of AOAC International, 2008, pp. 524-529, vol. 91, No. 3.

\* cited by examiner

COLORED FOODSTUFF HAVING A LOW PH

FIELD OF THE INVENTION

The present invention relates to a color stabilized foodstuff containing a phycocyanin from *spirulina*-extract, and a process to prepare the foodstuff.

BACKGROUND OF THE INVENTION

Colored gummies, jams, and fruit preparation and colored syrups for use in beverage and food applications are known in the art. Syrups are used in beverage fountain machines, as a dosing solution in manufacturing of food and beverages, and sold commercially for food and beverage applications. The application of natural food color additives has increased in the food industry, due to increased consumer demands. While natural food color additives have been applied to gummies, jams, fruit preparation, and syrups having a pH less than 4.6, there is a need for a stable blue pigment which can be used on its own or blended with other colors to deliver a range of colors including but not limited to stable green, purple, brown, or black color.

US2018271119 discloses the use of phycocyanin derived from *Galdieria sulphuraria*, which is capable of growing at both high temperature and low pH, for use in beverages. But *Galdieria sulphuraria* phycocyanin extracts have not yet been approved or undergone long term testing, as *Spirulina* derived phycocyanin has.

Selig, et al. *Food Hydrocolloids*, 74, 46-52, (2017) discloses the use of beet-pectin to stabilize phycocyanin from a *spirulina*-extract at pH 6.8 in an aqueous solution. Beet-pectin appears to be effective at pH 6.8, but not at lower pHs and thus could not be used for high acid foods and beverages.

Dewi, et al. *IOP Conf. Ser.: Earth Environ. Sci.* 55 (2017) discloses a *spirulina*-extract encapsulated in κ-carrageenan for use in an aqueous solution.

Phycocyanin, from a *spirulina*-extract, is to-date the only natural blue pigment approved by the US-FDA (FR Doc No: 2013-19550) and European Union as a coloring food. It is sold in liquid or in powder form for use as blue pigment in foods. Phycocyanin, however, has the disadvantage of being unstable at acidic pH, below 4.6, leading to loss of coloring and to precipitation, from protein aggregation, which limits the use of phycocyanin. Thus, phycocyanin has limited use for its food coloring properties in gummies, such as starch, pectin, or gelatin and syrups, such beverage syrups for carbonated or non-carbonated drinks, flavored syrups to apply to food and drinks, such as shaved ice, or as a dosing solution during manufacturing of food products. Health conscious customers demand a wide range of naturally colored food products, and phycocyanin is to-date the only available natural blue food color additive. Hence, there is a need to stabilize phycocyanin at acidic pH.

Stability of phycocyanin containing *spirulina*-extract is pH, ionic strength, and temperature dependent. The protein and phycobiliprotein fractions in *spirulina* have an isoelectric point between pH 3.0-4.7 and this is where solubility in water is the lowest (Benelhadj et al., 2016; Hattori et al., 1965). Precipitation of *spirulina* concentrate occurs in the pH range of 2.7-6.0 with the worst precipitation at the isoelectric point. At a pH below 2.7, *spirulina* concentrate will stay in solution, however, color degradation is unacceptable as the color shifts from blue to pale green within 6 weeks at 32° C. in a cold fill syrup.

SUMMARY OF THE INVENTION

The inventors have found a solution to stabilize the blue color, from a phycocyanin containing *spirulina*-extract, in acidic foodstuffs.

The present invention relates to a foodstuff, comprising
a. a *spirulina*-extract comprising phycocyanin,
b. at least one multi-sulphated carrageenan and
c. water,
   wherein the amount of multi-sulphated carrageenan is between 0.006 and 0.6 wt. %,
   wherein the amount of phycocyanin ranges between 0.003 and 0.5 wt. %,
   wherein the amount of water ranges between 15 and 80 wt %, and wherein
d. when the foodstuff contains at least 45 and at most 80 wt. % water, the weight ratio between multi-sulphated carrageenan and phycocyanin ranges between 2:1 and 150:1, and the pH of the foodstuff ranges between 2.0-3.7, preferably 2.2-3.5, most preferably 2.3-3.3, or
e. when the foodstuff contains at least 15 and less than 45 wt. % water,
   i. the weight ratio between multi-sulphated carrageenan and phycocyanin ranges between 1.5:1 and 100:1 at a pH of at least 2 and less than 2.5,
   ii. the weight ratio between multi-sulphated carrageenan and phycocyanin ranges between 0.7:1 and 75:1 at a pH of at least 2.5 and less than 2.9, and
   iii. the weight ratio between multi-sulphated carrageenan and phycocyanin ranges between 0.4:1 and 50:1 at a pH of at least 2.9 and less than 5, and
wherein the wt. % are relative to the total weight of the foodstuff.

The invention increases color stability of the food stuff and solves one or more of the compounding negative effects of the acidic condition on the blue color of the foodstuff. The negative effects are aggregation/precipitation, color fading, color changes, color degradation during thermal processing, and lack of stability over time (weeks or months), as foodstuffs need to withstand long transport and varying storage conditions.

Advantages of the foodstuff according to the invention are color stability and prevention of aggregation/precipitation; thereby enabling food products to be naturally colored; for example, in blue and blue-based colors.

DETAILED DESCRIPTION OF THE INVENTION

The foodstuff of the invention contains multi-sulphated-carrageenan, a phycocyanin containing *spirulina*-extract and is acidic, having a low pH. The foodstuff is further characterized by the amount of phycocyanin present, the amount of multi-sulphated carrageenan, and the ratio between multi-sulphated carrageenan and phycocyanin. When the amount of water is low (this is at least 15 wt. % water and less than 45 wt. % water), the optimum ratio between multi-sulphated carrageenan and phycocyanin depends on the pH of the foodstuff.

The foodstuff has a water content of 15-80 wt. %.

The wt. % is defined as the weight % of a component relative to the total weight of the foodstuff, unless defined otherwise.

The foodstuff according to the present invention is preferably a syrup for use in food and beverage applications, or foodstuff with high solid content, example smoothie, fruit preparation, gummy, jam, or jelly.

The foodstuff's color can be required to be stable over a long period of time (through transport and storage over weeks or months), at low pH, and/or after exposure to high temperature of up to 120° C., as these temperatures are used in the food industry in processes to cook or pasteurize to ensure food safety.

Phycocyanin

The foodstuff contains a *spirulina*-extract containing phycocyanin.

The phycocyanin containing *spirulina*-extract can be a water extract of for example *Arthrospira platensis* and *Arthrospira maxima. Spirulina* is an edible and EU and FDA-approved cyanobacteria that contains carbohydrates, lipids, fiber, minerals, amongst other proteins, for example phycobiliproteins. The phycobiliproteins comprise of C-phycocyanin and allophycocyanin. Phycocyanin exhibit the blue color of the foodstuffs according to the present invention. The total phycocyanin content (which is the sum of the C-phycocyanin and allophycocyanin) in phycocyanin containing *spirulina*-extracts may vary by manufacturers and may typically range from 0.7-45.0 w/w %. It is also possible to apply higher concentrations of phycocyanin. The phycocyanin containing *spirulina*-extract may also be known as *Spirulina* color concentrate, as for example the EXBERRY® Blue Powder. The phycocyanin containing *spirulina*-extract may be liquid or dry (powder or granule) and may contain diluents such as water, invert sugar, sucrose, and/or maltodextrin as example. For use in this invention, liquid and dry forms of phycocyanin containing *spirulina*-extract are applicable.

The foodstuff preferably contains a dissolved phycocyanin from a *spirulina*-extract.

Multi-Sulphated Carrageenan

The foodstuff contains a multi-sulphated carrageenan or combination of multi-sulphated carrageenans.

The foodstuff preferably contains dissolved multi-sulphated carrageenan.

Carrageenans are sourced from seaweed and they are highly flexible molecules that can form curling helical structures. Carrageenans are characterized as linear polysaccharides with repeating galactose units. Carrageenans are classified by the degree of sulfonation. Examples of mono-sulphated carrageenans are κ-carrageenan, γ-carrageenan and α-carrageenan. Examples of di-sulphated carrageenans are ι-carrageenan, δ-carrageenan, μ-carrageenan and θ-carrageenan. Examples of tri-sulphated carrageenans are λ-carrageenan and ν-carrageenan.

Multi-sulphated carrageenans are carrageenans containing at least 2 sulphate groups, preferably 2 or 3 sulphate groups per disaccharide unit.

In some embodiments the multi-sulphated carrageenan can be a non-degraded carrageenan.

In some embodiments the multi-sulphated carrageenan can be hydrolyzed multi-sulphated carrageenan preferably by thermal treatment of a non-degraded multi-sulphated carrageenan under acidic pH conditions.

Thermal treatment of carrageenan solutions at acidic pH leads to a hydrolysis of the glycosidic bonds ($\alpha$(1-3) and $\beta$(1-4) bonds) connecting the alternating D-galactose residues. Thus, the average molecular weight was shown to decrease with increasing hydrolysis duration (Singh & Jacobsson, 1994). In addition, a good correlation of the measured viscosity and the molecular weight was observed, meaning that with decreasing molecular weight the viscosity decreases (Singh & Jacobsson, 1994). Preferably the pH is between 1.4 and 4 and preferably the temperature is between 20-98° C. for hydrolysis of the glycosidic bonds; more preferably between 55 and 98° C.

Due to the uniform backbone structure, the concentration of carrageenan can be quantified by the content of galactose. In addition, the quantification of galactose allows to determine if the glycosidic bond or also the galactose monomer unit are degraded by the hydrolysis conditions.

A possibility to quantify galactose is the quantification of monosaccharides after acid hydrolysis. Hydrolysis of carrageenan is performed with 72% sulphuric acid ($H_2SO_4$) for 30 min at 30° C., followed by further hydrolysis after dilution to 6% sulphuric acid ($H_2OS_4$) for 3 hours at 100° C. The amount of monosaccharides rhamnose, galactosamine, arabinose, glucosamine, galactose, glucose, mannose, xylose, galacturonic acid and glucuronic acid in the hydrolysate can be quantitatively analyzed by High Performance Anion Exchange Chromatography with Pulsed Amperometric Detection (HPAEC-PAD) on a gold electrode. Analyses are performed with an ICS-5000 DP pump, AS-AP autosampler, DC column compartment and ED electrochemical detector (Thermo Scientific). The neutral monosaccharides are eluted using a gradient of 18 mM sodium hydroxide and 200 mM sodium hydroxide with 75 mM sodium acetate. Data analysis is done with Chromeleon software version 7.2 (Thermo Scientific). Quantitative analyses are carried out using standard solutions of the monosaccharides (Sigma-Aldrich).

Analysis of galactose content of the used lambda carrageenan powders shows a galactose content of 50-55 wt. %.

Quantification of the galactose content in hydrolyzed carrageenan solutions showed comparable galactose contents as related to the initial amounts of used carrageenan powder. These results demonstrate that a hydrolysis of carrageenan at pH between 1.4 and 4 and temperatures ≤95° C. result in the hydrolysis of the glycosidic bonds but do not degrade the galactose unit itself.

In addition, the degree of sulphonation can be quantified by the amount of Sulphur. A possibility to quantify Sulphur is based on the combustion of the sample at temperatures above 1000° C. and reduction of the released Sulphur to Sulphur dioxide (Elementar Vario Max Cube). The amount of Sulphur is quantified by an IR detector which is calibrated using a calibration curve of sulfadiazine.

The viscosity of the carrageenan solutions was characterized by viscometry using an Anton Paar Rheometer MCR 302 (Switzerland). Flow curves were measured with a shear rate (1/s) range from 1 to 300 (linear increase within 25 min) at 20° C. To compare different carrageenan solutions, the viscosity at a shear rate of 100/s is used.

The preferred multi-sulphated carrageenans of the invention are ι-carrageenan, δ-carrageenan, μ-carrageenan, θ-carrageenan, λ-carrageenan and ν-carrageenan, the hydrolysed products of ι-carrageenan, δ-carrageenan, μ-carrageenan, θ-carrageenan, λ-carrageenan and ν-carrageenan; more preferred are ι-carrageenan and λ-carrageenan, and its hydrolyzed products and most preferred is λ-carrageenan and hydrolyzed λ-carrageenan.

Mixtures of multi-sulphated carrageenans can also be used.

The multi-sulphated carrageenans to be used in the present invention have preferably a viscosity between 1 and 3000 mPas, when dissolved as a 4 wt. % solution in water at a pH of 5.5.

The dissolved multi-sulphated carrageenans of the invention stabilize the color of the phycocyanin across the full pH range and stabilize the color over time (weeks, for example 6 weeks or more at 32° C.), while mono-sulphated carrageenans work in a limited pH range and do not have the effect of color stabilization over time.

The multi-sulphated carrageenan content of the foodstuff is between 0.006-0.6 wt. %, preferably between 0.02-0.5 wt. %, more preferably between 0.03-0.4, most preferably 0.05-0.3 wt %.

The optimum ratio of dissolved multi-sulphated carrageenans and phycocyanin slightly depends on the water content and the pH of the foodstuff. At high water content of at least 45 wt % and at most 80 wt. %, the weight ratio between multi-sulphated carrageenan and phycocyanin ranges between 2:1 and 150:1. The pH of the foodstuff at this high water content ranges between 2.0-3.7, preferably 2.2-3.5, most preferably 2.3-3.3.

At low water content of at least 15 and less than 45 wt. % water, the weight ratio between multi-sulphated carrageenan and phycocyanin ranges between 1.5:1 and 100:1 at a pH of at least 2 and less than 2.5. The weight ratio between multi-sulphated carrageenan and phycocyanin ranges between 0.7:1 and 75:1 at a pH of at least 2.5 and less than 2.9, and the weight ratio between multi-sulphated carrageenan and phycocyanin ranges between 0.4:1 and 50:1 at a pH of at least 2.9 and less than 5.

The phycocyanins and carrageenans are preferably dissolved in the liquid feedstock. Dissolved means that as the phycocyanins and carrageenans stay in the aqueous solution. The solution is clear to the eye and does not show sediment or floating particulates.

Color

It is known that the phycocyanin configuration impacts color hue. As pH decreases and the equilibrium of C-phycocyanin is shifted to monomers, the color hue shifts from dark blue to blue green (Buchweitz, 2016). In general, at pH values of 3.9 and less the equilibrium of C-phycocyanin is shifted to monomers.

The color performance is assessed using hue measurements and the total sum of blue absorbance.

The color hue is measured using spectrophotometer for aqueous solution and DigiEye Color Measurement and Imaging System for semi-solid and solid foodstuff. CIE L*a*b* value is calculated. Colorimeter measurements provide a numerical representation of color based upon Opponent Color Theory where CIE L*a*b* represents (CIELAB color space):

L* scale: Light vs. Dark where a low number (0-50) indicates Dark and a high number (51-100) indicates Light.

a* scale: Red vs Green where a positive number indicates Red and a negative number indicates Green.

b* scale: Yellow vs. Blue where a positive number indicates Yellow and a negative number indicates Blue.

$$\Delta E = \sqrt{(L^*_1 - L^*_0)^2 + (a^*_1 - a^*_0)^2 + (b^*_1 - b^*_0)^2}$$

ΔE is the overall measure of color difference.

In acidic conditions, it is hypothesized that negatively charged multi-sulphated carrageenans, like for example lambda and iota carrageenan, form complexes with positively charged phycocyanin and prevents it from aggregating and stabilizes the color. A clear shift in color hue is observed with the addition of multi-sulphated carrageenan, like for example Iota and lambda carrageenan, in acidic conditions. Table 1 shows the difference in color hue measured by spectrophotometer and represented as CIE L*a*b* at various pHs without and with lambda carrageenan at 0.05% and with constant *spirulina*-extract EXBERRY® Blue Powder 60000002 at 0.5 wt. % (0.012% phycocyanin).

At pH 6.5, there is no change in color hue when lambda carrageenan is added. The ΔE between control and variant at pH 6.5 is 1.0 which indicates no difference in color hue. Between pH 2.6-4.0, the ΔE value is greater than 10 which indicates a significant shift in color. The addition of carrageenan shifts the color hue to be lighter (higher L*) and less blue/more yellow (higher b*).

TABLE 1

Measured CIE L*a*b* values for a beverage model system at various pH and addition of 0.05 wt. % Lambda Carrageenan

| | CONTROL | | | VARIANT (0.05 wt. % Lambda Carrageenan) | | | |
|---|---|---|---|---|---|---|---|
| | L | a* | b* | L* | a* | b* | ΔE |
| pH 6.5 | 77.12 | −19.03 | −32.24 | 76.44 | −18.24 | −32.36 | 1.0 |
| pH 4.0 | 66.68 | −23.33 | −18.36 | 85.69 | −17.81 | −15.01 | 20.1 |
| pH 3.5 | 70.16 | −19.45 | −21.44 | 88.92 | −16.48 | −9.66 | 22.4 |
| pH 2.9 | 80.13 | −19.39 | −20.04 | 89.65 | −16.21 | −7.47 | 16.1 |
| pH 2.6 | 83.6 | −19.14 | −15.66 | 89.64 | −14.77 | −4.15 | 13.7 |

The standard method for the phycocyanin determination was established by Yoshikawa & Belay (2008) to calculate the native phycocyanin content (mg/mL) from photometric measurements. It relies upon absorbance measurements at 620 and 650 nm and the extinction coefficients of C-phycocyanin and allophycocyanin at these wavelengths at pH 6.0.

Figure 1:
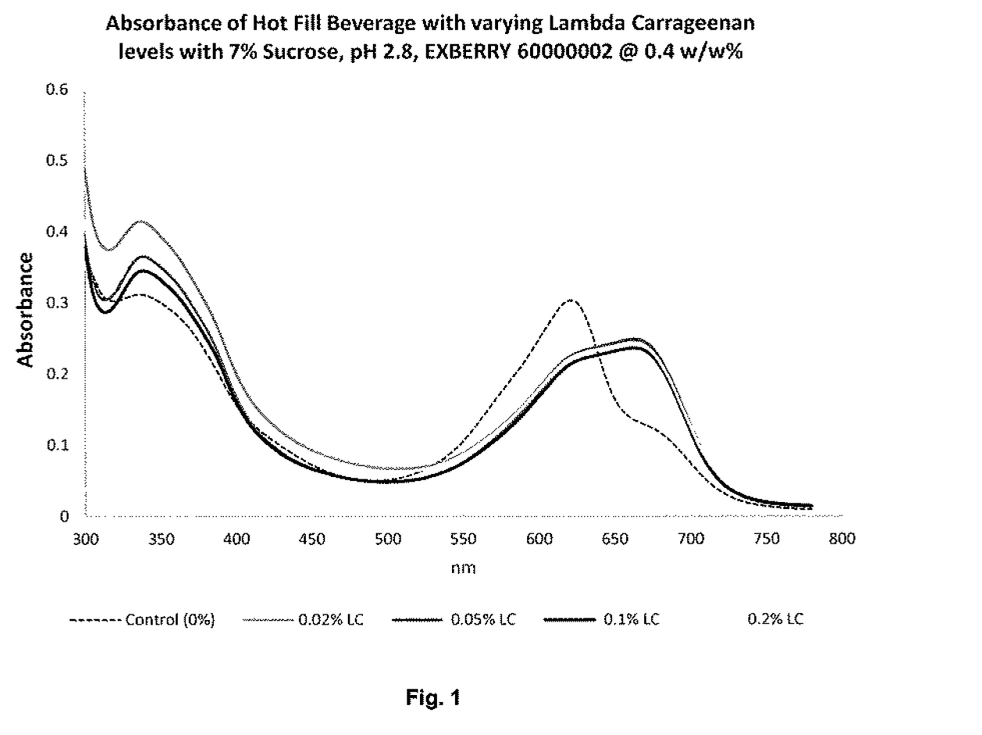
FIG. 1: Photometric analysis of beverage model system (pH 2.8) without and with the addition of 0.02-0.20_wt. % λ-carrageenan. The shape of the curve and shift of the visible peak maximum to 660-670 nm stayed consistent with each dosage level of λ-carrageenan. The shift in the photometric curve was surprising and suggests that λ-carrageenan is binding with the phycocyanin in acidic conditions.

The addition of multi-sulphated carrageenan, changes the shape of phycocyanin peak and in some cases, the peak maximum shifts from 620 nm to between 660-670 nm. Calculating phycocyanin content using only absorbance measurements at 620 and 650 nm would underestimate phycocyanin content for solutions containing multi-sulphated carrageenan (see FIG. 1). Thus, to determine the magnitude of color retention, the sum of the blue absorbance measurements at A620 nm-A750 nm, A650 nm-A750 nm, and A667 nm-750 nm are calculated and used.

$$\text{Total sum of blue absorbance} = (A_{620\,nm} - A_{750\,nm}) + (A_{650\,nm} - A_{750\,nm}) + (A_{667\,nm} - A_{750\,nm})$$

The total phycocyanin content in a *spirulina*-extract is calculated using Yoshikawa & Belay (2008) method at pH 6.0 which is listed below.

$$\text{allophycocyanin}\left(\frac{mg}{mL}\right) = 0.18(A_{650nm} - A_{750nm}) - 0.042(A_{620nm} - A_{750nm})$$

$$\text{C phycocyanin}\left(\frac{mg}{mL}\right) = 0.162(A_{620nm} - A_{750nm}) - 0.098(A_{650nm} - A_{750nm})$$

$$\text{Total Phycocyanin}\left(\frac{mg}{mL}\right) = \text{allophycocyanin}\left(\frac{mg}{mL}\right) + \text{C-phycocyanin}\left(\frac{mg}{mL}\right)$$

To determine the amount of phycocyanin added to a foodstuff, the dosage level of *spirulina*-extract is multiplied by the total phycocyanin content in the *spirulina*-extract. The phycocyanin content of the liquid foodstuff is preferably between 0.003-0.5 wt. %, preferably 0.007-0.4 wt. %, and most preferably 0.01-0.25 wt. %.

The challenge with phycocyanin containing *spirulina*-extracts is the application to acidified aqueous systems. *Spirulina* proteins (including phycocyanin) precipitate out of solution when the pH is between 2.7-6.0. Precipitation may occur immediately or after a few weeks and this is dependent upon factors such as the viscosity, ionic strength, order of addition, temperature, and pH of the solution. The aggregation/precipitation is assessed visually and can be a cause for the color loss. High absorbance at 750 nm after acidification and/or processing can indicate a strong potential for protein aggregation/precipitation.

Other Components

The foodstuff may further contain other components like for example sweeteners, stabilizers, chelating agents, acids, proteins, salts, flavors, vitamins, minerals, pigments, thickeners and preservatives.

The acidic foodstuff may have a blue color due to the phycocyanin content, but other colors based on blue may be obtained by way of mixing other pigments in with the foodstuff. The foodstuff may contain other pigments, such as safflomin (safflower), anthocyanin, carotenoid, betanin, annatto, lycopene, curcumin and chlorophyll. The pigments may be added to the blue colored phycocyanin containing foodstuff to blend into other colors, such as for example green using safflomin.

Examples of sweeteners are invert sugar, sucrose, high fructose corn syrup, corn syrup, fructose, glucose, trehalose, lactose, honey, agave, stevia, sucralose, aspartame, neotame, acesulfame potassium, monk fruit, or saccharine.

Examples of preservatives are salts, sorbic add, benzoic acid, natamycin, nisin and sulfites.

Examples of salts are ionic compounds that can be formed with the positively charged cation such as calcium, magnesium, potassium, sodium, or copper with salt forming anions like for example acetate, carbonate, chloride, citrate, oxide, phosphate, sorbate, benzoate, hexametaphosphate or sulfate.

Examples of adds are phosphoric, citric, lactic, malic, adipic, tartaric acid or sodium acid pyrophosphate.

Examples of thickeners are gelatin, starch, pectin, konjac, or agar.

The foodstuff may contain chelators, which may also be referred to as chelating agents.

Chelators are binding agents that influence the chemical and/or physical state of the molecules/atoms they bind by forming chelates. Chelators can improve color retention and have been found to work synergistically with the multi-sulphated carrageenans.

Chelating agents can be synthetic and natural compounds and include the group of ethylene diamine tetra acetic acid and/or its Na, K, Ca salts (EDTA), L-glutamic acid N,N-diacetic acid tetrasodium salt (GLDA), sodium hexametaphosphate, glutathione, metallotheionein, 2,3-dimerapto-1-propanesulfonic acid, chlorella, garlic, cilantro, selenium, milk thistle, vitamin C, vitamin E, citrates, grape seed extract, quercetin, and lipoic acid.

The chelating agents are preferably selected from the group of ethylene diamine tetra acetic acid and/or its Na, K, Ca salts (EDTA) and L-glutamic acid N,N-diacetic acid tetrasodium salt (GLDA). EDTA is considered to be ethylene diamine tetra acetic acid together with its Na, K, Ca salts, like for example calcium disodlum ethylenediaminetetraacetate, disodium ethylenediaminetetraacetate, tetrasodium ethylenediaminetetraacetate, dipotassium ethylenediaminetetraacetate, and tripotassium ethylenediaminetetraacetate.

Calcium disodium ethylenediaminetetraacetate is abbreviated to CaNa2 EDTA, disodium ethylenediaminetetraacetate is abbreviated to Na2 EDTA, tetrasodium ethylenediaminetetraacetate is abbreviated to Na4 EDTA, dipotassium ethylenediaminetetraacetate is abbreviated to K2 EDTA, and tripotassium ethylenediaminetetraacetate is abbreviated to K3 EDTA.

The chelating agent is preferably present between 1-2000 ppm in the foodstuff.

1 ppm of chelating agent is to be understood as 0.0001 wt. %; for example, 30 ppm of EDTA are 0.003 wt %.

EDTA is preferably present between 10-300 ppm, preferably 15-200 ppm, most preferably 20-100 ppm.

The EDTA and phycocyanin from a *spirulina*-extract are preferably present within the foodstuff at a weight ratio between 4:1-1:200, preferably between 2:1-1:125, most preferably 1:1-1:75.

The multi-sulphated carrageenans in combination with a chelator such as EDTA showed a surprisingly high increase in color retention and extended shelf life after thermal treatment and/or use of preservatives. The effect of EDTA is the most pronounced in the presence of preservatives, and/or after thermal processing below a pH 2.7 or above a pH of 3.2.

Process

Foodstuffs are typically transported and stored before being consumed. To assure that these foodstuffs do not spoil and are safe for consumption, either thermal processes, preservatives, water activity, or combination of above are used.

A considerable blue color loss is observed upon high temperature short time (210° C. for 6 seconds) processing and when preservatives are used for solutions without carrageenans.

The multi-sulphated carrageenans in combination with a chelator such as EDTA showed a surprisingly high increase in color retention and extended shelf life after thermal treatment and/or use of preservatives.

The foodstuff can be obtained according to a process comprising the following steps:
a) Adding and dissolving the multi-sulphated carrageenan in water and mixing until the multi-sulphated carrageenans are dissolved, as determined by visual observation.
b) Adding the phycocyanin containing *spirulina*-extract, and mixing until dissolved at a pH of at least 5, preferably at a pH between 5 and 10;
c) Adding an acid or acidifying component;
d) Optionally adding a sweetener, flavor, vitamins, minerals, salts, buffers, or other beverage components;
e) Optionally adding a chelating agent, such as EDTA;
f) Optionally adding other pigments, such as anthocyanins;
g) Optionally adding an additive, such as preservatives;
h) Treating the mixture of a)-h) by either
thermally processing the liquid to at least 65° C.; or
no thermal treatment and cold filling, or combinations of the two.

It is important that phycocyanin containing *spirulina* extract is added to dissolved multi-sulphated carrageenan optionally in presence of other components at a pH of 5.0 and above. List of compounds that may destabilize phycocyanin includes but is not limited to acid, anthocyanins, vitamin C, safflower, and alcohol. Acids can be used to prepare a hydrolyzed carrageenan, but the hydrolyzed carrageenan should be neutralized to a pH of at least 5 before mixing with the phycocyanin.

Components that do not destabilize phycocyanin, can be added during or before step a) of the process. Multi-sulphated carrageenan can for example be dry blended with a non-acidic carbohydrate such as sucrose or maltodextrin to improve dissolution.

Step c) (adding of the acid or acidifying component) can be done before or after steps d), e), or f). Step h) is preferably performed after steps a)-g).

If present, preservatives (step g) preferably are added before or during a) step due to solubility limitations of the preservatives.

Multi-sulphated carrageenans are linear polysaccharides with repeating sulphated galactose units. The glycosidic linkages between galactose units are subject to hydrolysis with heat and acid. Hydrolyzed multi-sulphated carrageenan is found to also stabilize phycocyanin, however, hydrolyzed multi-sulphated carrageenan must be neutralized to a pH above 5 prior to complexing with phycocyanin. Both hydrolyzed and non-degraded multi-sulphated carrageenan should have a pH above 5 prior to the addition of phycocyanin to prevent precipitation. Preferably the pH of the solution containing multi-sulphated carrageenan is between 5 and 10, more preferably between 5.5 and 9.9.

It is noted that the invention relates to all possible combinations of features described herein, preferred in particular are those combinations of features that are present in the claims. It will therefore be appreciated that all combinations of features relating to the composition according to the invention, all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

REFERENCES

Buchweitz, M. (2016). 17—Natural Solutions for Blue Colors in Food. In R. Carle, & R. M. Schweiggert (Eds.), *Handbook on Natural Pigments in Food and Beverages* (pp. 355-384): Woodhead Publishing.

Dewi, E. N. at al. 2017, "Physical characteristics of phycocyanin from *Spirulina* microcapsules using different coating materials with freeze drying method", *IOP Conf. Ser.: Earth Environ. Sci.* 55.

Patino, J. & Pilosof, A., (2011). "Protein-polysaccharide interactions at fluid interfaces." *Food Hydrocolloids*, 25, 1925-1937.

Selig, M. J., et al., (2017), "Protection of blue color in a *spirulina* derived phycocyanin extract from proteolytic and thermal degradation via complexation with beet-pectin", *Food Hydrocolloids*.

Singh, Satish K. and Jacobsson, Sven P. (1996). Kinetics of acid hydrolysis of κ-carrageenan as determined by molecular weight (SEC-MALLSRI), gel breaking strength, and viscosity measurements. *Carbohydrate Polymers*, 23, 89-103.

Yoshikawa & Belay (2008) Yoshikawa, N., & Belay, A. (2008). Single-Laboratory Validation of a Method for the Determination of c-Phycocyanin and Allophycocyanin in *Spirulina* (*Arthrospira*) Supplements and Raw Materials by Spectrophotometry. *Journal of AOAC International*, 91, 524-529.

EXAMPLES

Experiment 1

Experiment 1.1

Various hydrocolloids were investigated to determine which ones prevented phycocyanin precipitation/aggregation and mitigated color loss. Seven hydrocolloids were tested at a dosage level of 0.05 wt. % in a 7 wt. % sucrose solution at pH 3.3 and EXBERRY® Shade Blue Powder 60000002 phycocyanin containing *spirulina*-extract at 0.5 wt. % (equating to 0.012 wt. % phycocyanin). The beverage solution was thermally processed to 85° C. and filled hot into PET bottles and cooled in a water bath to less than 35° C.

Figure 2:
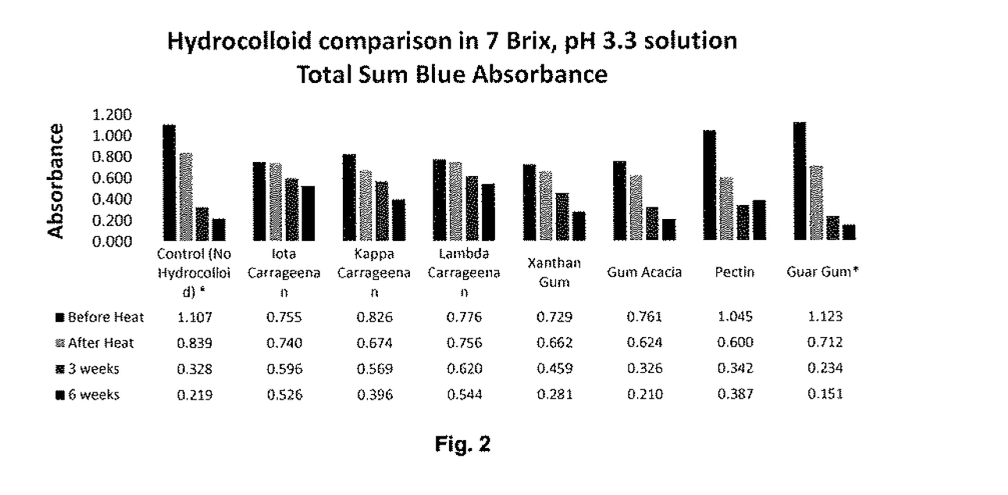
FIG. 2: Samples at pH 3.3 placed in accelerated conditions (32° C. hotbox) for 6 weeks and measured at week 0, 3 and 6. The measurement is the total sum of blue absorbance. Lambda equals λ-carrageenan, iota equals ι-carrageenan and kappa equals κ-carrageenan.

From the experiment, the control sample (no hydrocolloid) and the sample with guar gum had significant precipitation after thermal processing. The remaining solutions containing ι-carrageenan, κ-carrageenan, λ-carrageenan, xanthan gum, high methoxyl (HM) pectin (citrus/apple), and gum acacia prevented precipitation, however, color retention varied between the different hydrocolloids. HM pectin (citrus/apple), xanthan gum, gum acacia and guar gum accelerated color loss in acidic conditions. The samples were placed into 32° C. hotbox for 6 weeks and analyzed at week 0, 3 and 6. Multi-sulphated carrageenans had a surprisingly long-lasting impact on color preservation (see FIG. 2 and table 2).

TABLE 2

Total Sum of Blue Absorbance after thermal processing and 6 weeks in 32 C hot box

| | Total Sum of Blue Absorbance 6 weeks @ 32 C |
|---|---|
| Control (No Hydrocolloid)* | 0.219 |
| Iota Carrageenan | 0.526 |
| Kappa Carrageenan | 0.396 |
| Lambda Carrageenan | 0.544 |
| Xanthan Gum | 0.281 |
| Gum Acacia | 0.210 |
| HM Pectin (citrus/apple) | 0.387 |
| Guar Gum* | 0.151 |

*Precipitated

Experiment 1.2

Additional hydrocolloids were evaluated to determine if color stabilization is specific to multi-sulphated carrageenan. Cellulose gum, locust bean gum, propylene glycol alginate, sodium alginate, Low Methoxyl (LM) Pectin (citrus/apple), High Methoxyl (HM) Pectin (sugar beet), Amidated Pectin (citrus/apple) were tested at a dosage level of 0.058 wt. % in a 7 wt. % sucrose solution at pH 3.3 and EXBERRY® Shade Blue Powder 60000002 phycocyanin containing *spirulina*-extract at 0.5 wt % (equating to 0.012 wt. % phycocyanin).

The beverage solutions were thermally processed to 85° C. and filled hot into PET bottles and cooled in a water bath to less than 35° C.

From the experiment, the cellulose gum, locust bean gum, and amidated pectin variants had significant precipitation after thermal processing. Beverages containing propylene glycol alginate, sodium alginate, LM pectin (citrus/apple), and HM pectin (sugar beet) did not have precipitate post processing, however, color retention was poor after 6 weeks in 32° C. hotbox. Lambda carrageenan beverages performed significantly better than cellulose gum, locust bean gum, propylene glycol, sodium alginate, three different pectin types (table 3).

TABLE 3

Total Sum of Blue Absorbance after thermal processing and 6 weeks in 32 C hot box

|  | Total Sum Blue Absorbance (6 weeks @ 32 C) |
|---|---|
| Lambda Carrageenan | 0.49 |
| Cellulose Gum* | 0.02 |
| Locust Bean Gum* | 0.18 |
| Propylene Glycol Alginate | 0.29 |
| Sodium Alginate | 0.20 |
| LM Pectin (citrus/apple) | 0.37 |
| HM Pectin (sugar beet) | 0.27 |
| Amid Pectin (citrus/apple)* | 0.02 |

*Precipitated

Experiment 1.3

The same hydrocolloids as in experiment 1.1 were evaluated at pH 2.9 and 4.0 to determine which hydrocolloids have the largest impact on color retention. Seven hydrocolloids were tested at a dosage level of 0.05 wt. % In a 7 wt. % sucrose solution at pH 2.9 and 4.0 with EXBERRY® Shade Blue Powder 60000002 phycocyanin containing *spirulina*-extract at 0.5 wt. % (equating to 0.012 wt. % phycocyanin). The beverage solutions at pH 2.9 and 4.0 were thermally processed to 85° C. (microwave) and filled hot into PET bottles and cooled in a water bath to less than 35° C.

*Spirulina* aggregation occurred in all samples, except for the λ-carrageenan, ι-carrageenan and HM pectin (citrus/apple) (see table 4). Though pectin did not lead to precipitation of *spirulina*, it does lead to accelerated color loss in acidic conditions (see tables 2-4 and FIG. 2).

TABLE 4

Aggregation behavior of spirulina proteins post thermal processing

| pH | Control | LC | i-C | κ-C | HM Pectin (citrus/apple) | Xanthan | Gum Acacia | Guar Gum |
|---|---|---|---|---|---|---|---|---|
| 2.9 | No | No | No | Yes | No | Yes | Yes | Yes |
| 4.0 | Yes | No | No | Yes | No | No | No | Yes |

LC: lambda carrageenan,
i-C: iota carrageenan,
κ-C: kappa carrageenan

Experiment 1.3

The same hydrocolloids as in experiment 1.1 were evaluated at pH 2.9 and 4.0 to determine which hydrocolloids have the largest impact on color retention. Seven hydrocolloids were tested at a dosage level of 0.05 wt. % in a 7 wt. % sucrose solution at pH 2.9 and 4.0 with EXBERRY® Shade Blue Powder 60000002 phycocyanin containing *spirulina*-extract at 0.5 wt. % (equating to 0.012 wt. % phycocyanin). The beverage solutions at pH 2.9 and 4.0 were thermally processed to 85° C. (microwave) and filled hot into PET bottles and cooled in a water bath to less than 35° C.

*Spirulina* aggregation occurred in all samples, except for the λ-carrageenan, ι-carrageenan and HM pectin (citrus/apple) (see table 4). Though pectin did not lead to

Experiment 2

Dosage levels of 0.02-0.20 wt. % of Ticaloid® 750 (TIC GUMS) λ-carrageenan in a pH 2.8 beverage with EXBERRY® Shade blue powder 60000002 phycocyanin containing *spirulina*-extract at 0.4 wt. % (equating to 0.0093 wt. % phycocyanin) was set up, thermally processed to 85° C. (microwave) and filled hot into PET bottles. The 6 weeks aged (at 32° C.) hot filled beverages at pH 2.8 were measured for their absorbance with no λ-carrageenan and four different levels of λ-carrageenan. The percent improvement was determined using the total sum of blue absorbance and modified total phycocyanin calculations measured at pH 2.8 instead of pH 6.0 as referred in Yoshikawa & Belay (2008) (see table 5).

TABLE 5

Color improvement as compared to control hot fill beverage at pH 2.6 and λ-carrageenan variants at 0.02-0.20 wt. % after 6 weeks storage at 32 C.

| Sample | Ratio LC:PC | $A_{620nm} - A_{750nm}$ | $A_{650nm} - A_{750nm}$ | $A_{667nm} - A_{750nm}$ | Total Sum of Blue Abs | % improve vs. Control | allo-PC (mg/mL) | C-PC (mg/mL) | Total PC (mg/mL) | % improve vs. Control |
|---|---|---|---|---|---|---|---|---|---|---|
| Control | 0.0 | 0.121 | 0.064 | 0.047 | 0.185 | NA | 0.006 | 0.013 | 0.020 | NA |
| 0.02% LC | 2.15 | 0.144 | 0.147 | 0.147 | 0.292 | 57% | 0.020 | 0.009 | 0.029 | 49% |
| 0.05% LC | 5.37 | 0.148 | 0.152 | 0.152 | 0.301 | 62% | 0.021 | 0.009 | 0.030 | 53% |
| 0.10% LC | 10.75 | 0.139 | 0.143 | 0.142 | 0.282 | 52% | 0.020 | 0.009 | 0.028 | 44% |
| 0.20% LC | 21.5 | 0.140 | 0.143 | 0.143 | 0.283 | 53% | 0.020 | 0.009 | 0.029 | 44% | allo-PC: allophycocyanin,
C-PC: C-phycocyanin,
PC: phyeacyanin,
LC-λ-carrageenan

Example 3

Example 3.1

Based upon the learnings from experiments 1 and 2, an experiment was done to determine the ability to stabilize phycocyanin from *spirulina*-extract in a syrup or concentrated solution using a multi-sulphated carrageenan. The challenge with increasing concentrations of protein and polysaccharides complexes is phase segregation (Patino, et al., 2011). Ionic strength and pH have a large impact on the protein-polysaccharide complexes and therefore the maximum concentration and ratio of LC:PC will vary based upon syrup composition. Table 6 shows a range of concentrated colored solutions (syrup) varying lambda carrageenan levels from 0 to 0.133 wt. %, acid content from 0.4 to 0.8 wt. %, and the ratio of LC:PC from 1.1:1 to 2.9:1. All formulations contained EXBERRY® Shade Blue liquid 60000202 added at 3.1 wt. % to deliver a phycocyanin content of 0.0465 wt. %. Preservative blend of 500 ppm potassium sorbate and 500 ppm sodium benzoate was used to control for yeast, mold and bacteria as syrups were not thermally processed. Disodium EDTA was used in the concentrated colored solution (syrup) at 30 ppm.

TABLE 6

Concentrated solutions with 0.0465 wt. % phycocyanin with varying lambda carrageenan levels, acid levels, and ratios of LC:PC

| Lambda Carrageenan (LC) in Syrup Wt. % | Ratio (LC:PC) | Water Wt. % | Sugar Wt. % | Acid Wt. % | pH | % Color Retention (6 wk 32° C.) |
|---|---|---|---|---|---|---|
| 0 | 0 | 70 | 28 | 0.8 | 2.5 | 44% |
| 0 | 0 | 70 | 28 | 0.6 | 2.7 | 39% |
| 0 | 0 | 70 | 28 | 0.4 | 2.9 | 32% |
| 0.133 | 2.9 | 70 | 28 | 0.8 | 2.5 | 82% |
| 0.133 | 2.9 | 70 | 28 | 0.6 | 2.7 | 81% |
| 0.133 | 2.9 | 70 | 28 | 0.4 | 2.9 | 79% |
| 0.08 | 1.7 | 70 | 28 | 0.8 | 2.5 | Failed (precip) |
| 0.08 | 1.7 | 70 | 28 | 0.6 | 2.7 | Failed (precip) |
| 0.08 | 1.7 | 70 | 28 | 0.4 | 2.9 | Failed (precip) |
| 0.05 | 1.1 | 70 | 28 | 0.8 | 2.5 | Failed (precip) |
| 0.05 | 1.1 | 70 | 28 | 0.6 | 2.7 | Failed (precip) |
| 0.05 | 1.1 | 70 | 28 | 0.4 | 2.9 | Failed (precip) |

At the phycocyanin level of 0.0465%, 70% water, and acid level ranging between 0.4-0.8%, the dosage level of lambda carrageenan and ratio of lambda carrageenan to phycocyanin was critical with preventing sedimentation and improving color stability. When the ratio of lambda carrageenan to phycocyanin was at 1.1 and 1.7, sedimentation occurred. When the LC:PC ratio was at 2.9, no sedimentation was observed and the color was stable between t pH range of 2.5-2.9. The samples with no carrageenan had significant color loss at the end of 6 weeks at 32° C. The samples with an LC:PC ratio of 2.9 had more than twice the color retention as the samples without lambda carrageenan.

Example 3.2

To fully understand the impact of acid, water level, phycocyanin level, carrageenan level, and ratio of LC:PC in an concentrated solution, a factorial experimental design was conducted to determine key drivers and boundary limits. Table 7 includes the factors in the study and the resulting range of lambda carrageenan to phycocyanin (LC:PC) ratios. All formulations contain 500 ppm potassium sorbate and 500 ppm sodium benzoate to control for yeast, mold, and bacteria as syrups were not thermally processed. Disodium EDTA was used in the concentrated colored solution (syrup) at 30 ppm. Water level was adjusted by reducing or increasing sucrose level. While the preferred method would be to adjust acid level for each formulation to reach a standardized pH, this was not done given the number of variants in this study. A specific acid level was added and pH was measured. Table 8 lists each variants, the measured pH, color retention after 6 weeks at 32° C., and notation if syrup failed due to sedimentation or gelling.

TABLE 7

Syrup Experimental Design varying water, acid, phycocyanin, and carrageenan levels

| 4 variables | 81 Variants | | |
|---|---|---|---|
| Water Level (wt. %) | 35% | 55% | 75% |
| Sucrose Level (wt. %) | 62% | 42% | 22% |
| EXBERRY ® Shade Blue 60000202 (wt. %) | 0.50% | 1.50% | 2.50% |
| Phycocyanin (wt. %) | 0.0155% | 0.0465% | 0.0775% |
| Ticaloid ® 750 λ-Carrageenan (wt. %) | 0.05% | 0.175% | 0.30% |
| Citric Acid (wt. %) | 0.10% | 0.50% | 0.90% |
| Ratio LC:PC (Range) | 0.6 | 19.4 | |

TABLE 8

Beverage Syrup Variants, pH, and Color Retention after 6 weeks at 32° C. (Total Sum of Blue Absorbance)

| Water (wt. %) | Phycocyanin (wt. %) | λ-Carrageenan (wt. %) | Ratio (LC:PC) | Acid (wt. %) | pH | % Color Retention (6 wk 32° C.) |
|---|---|---|---|---|---|---|
| 75 | 0.0155 | 0.05 | 3.2 | 0.1 | 3.8 | 62% |
| 75 | 0.0155 | 0.05 | 3.2 | 0.5 | 2.7 | 76% |
| 75 | 0.0155 | 0.05 | 3.2 | 0.9 | 2.4 | 78% |
| 75 | 0.0155 | 0.175 | 11.3 | 0.1 | 4 | 45% (insufficient) |
| 75 | 0.0155 | 0.175 | 11.3 | 0.5 | 2.7 | 74% |
| 75 | 0.0155 | 0.175 | 11.3 | 0.9 | 2.5 | 77% |
| 75 | 0.0155 | 0.3 | 19.4 | 0.1 | 4 | 42% (insufficient) |
| 75 | 0.0155 | 0.3 | 19.4 | 0.5 | 2.8 | 73% |
| 75 | 0.0155 | 0.3 | 19.4 | 0.9 | 2.5 | 75% |
| 75 | 0.0465 | 0.05 | 1.1 | 0.1 | 3.8 | 49% (insufficient) |

TABLE 8-continued

Beverage Syrup Variants, pH, and Color Retention after 6 weeks at 32° C.
(Total Sum of Blue Absorbance)

| Water (wt. %) | Phycocyanin (wt. %) | λ-Carrageenan (wt. %) | Ratio (LC:PC) | Acid (wt. %) | pH | % Color Retention (6 wk 32° C.) |
|---|---|---|---|---|---|---|
| 75 | 0.0465 | 0.05 | 1.1 | 0.5 | 2.8 | Failed (Sediment) |
| 75 | 0.0465 | 0.05 | 1.1 | 0.9 | 2.5 | Failed (Sediment) |
| 75 | 0.0465 | 0.175 | 3.8 | 0.1 | 4 | 46% (insufficient) |
| 75 | 0.0465 | 0.175 | 3.8 | 0.5 | 2.8 | 75% |
| 75 | 0.0465 | 0.175 | 3.8 | 0.9 | 2.5 | 82% |
| 75 | 0.0465 | 0.3 | 6.5 | 0.1 | 4.1 | 47% (insufficient) |
| 75 | 0.0465 | 0.3 | 6.5 | 0.5 | 2.8 | 77% |
| 75 | 0.0465 | 0.3 | 6.5 | 0.9 | 2.5 | 84% |
| 75 | 0.0775 | 0.05 | 0.6 | 0.1 | 4.0 | Failed (Sediment) |
| 75 | 0.0775 | 0.05 | 0.6 | 0.5 | NA | Failed (Sediment) |
| 75 | 0.0775 | 0.05 | 0.6 | 0.9 | NA | Failed (Sediment) |
| 75 | 0.0775 | 0.175 | 2.3 | 0.1 | 4 | 46% (insufficient) |
| 75 | 0.0775 | 0.175 | 2.3 | 0.5 | 2.9 | 75% |
| 75 | 0.0775 | 0.175 | 2.3 | 0.9 | 2.5 | 77% |
| 75 | 0.0775 | 0.3 | 3.9 | 0.1 | 4.4 | Gelled, blue |
| 75 | 0.0775 | 0.3 | 3.9 | 0.5 | 2.8 | 78% |
| 75 | 0.0775 | 0.3 | 3.9 | 0.9 | 2.5 | 80% |
| 55 | 0.0155 | 0.05 | 3.2 | 0.1 | 4.1 | 50% (insufficient) |
| 55 | 0.0155 | 0.05 | 3.2 | 0.5 | 2.7 | 74% |
| 55 | 0.0155 | 0.05 | 3.2 | 0.9 | 2.5 | 77% |
| 55 | 0.0155 | 0.175 | 11.3 | 0.1 | 4 | 51% (insufficient) |
| 55 | 0.0155 | 0.175 | 11.3 | 0.5 | 2.8 | 75% |
| 55 | 0.0155 | 0.175 | 11.3 | 0.9 | 2.5 | 77% |
| 55 | 0.0155 | 0.3 | 19.4 | 0.1 | 4 | 49% (insufficient) |
| 55 | 0.0155 | 0.3 | 19.4 | 0.5 | 2.9 | 74% |
| 55 | 0.0155 | 0.3 | 19.4 | 0.9 | 2.4 | 77% |
| 55 | 0.0465 | 0.05 | 1.1 | 0.1 | 4.1 | 61% |
| 55 | 0.0465 | 0.05 | 1.1 | 0.5 | 2.8 | Failed (Sediment) |
| 55 | 0.0465 | 0.05 | 1.1 | 0.9 | 2.5 | Failed (Sediment) |
| 55 | 0.0465 | 0.175 | 3.8 | 0.1 | 4.1 | 58% |
| 55 | 0.0465 | 0.175 | 3.8 | 0.5 | 2.9 | 81% |
| 55 | 0.0465 | 0.175 | 3.8 | 0.9 | 2.5 | 82% |
| 55 | 0.0465 | 0.3 | 6.5 | 0.1 | 4.2 | 42% (insufficient) |
| 55 | 0.0465 | 0.3 | 6.5 | 0.5 | 2.8 | 76% |
| 55 | 0.0465 | 0.3 | 6.5 | 0.9 | 2.5 | 78% |
| 55 | 0.0775 | 0.05 | 0.6 | 0.1 | 4.1 | 69% |
| 55 | 0.0775 | 0.05 | 0.6 | 0.5 | 2.8 | Failed (Sediment) |
| 55 | 0.0775 | 0.05 | 0.6 | 0.9 | NA | Failed (Sediment) |
| 55 | 0.0775 | 0.175 | 2.3 | 0.1 | 4.2 | 72% |
| 55 | 0.0775 | 0.175 | 2.3 | 0.5 | 2.8 | 78% |
| 55 | 0.0775 | 0.175 | 2.3 | 0.9 | 2.6 | 83% |
| 55 | 0.0775 | 0.3 | 3.9 | 0.1 | 4.4 | Gelled, blue |
| 55 | 0.0775 | 0.3 | 3.9 | 0.5 | 2.8 | 80% |
| 55 | 0.0775 | 0.3 | 3.9 | 0.9 | 2.5 | 86% |
| 35 | 0.0155 | 0.05 | 3.2 | 0.1 | 4.1 | 73%* |
| 35 | 0.0155 | 0.05 | 3.2 | 0.5 | 2.9 | 70% |
| 35 | 0.0155 | 0.05 | 3.2 | 0.9 | 2.4 | 73% |
| 35 | 0.0155 | 0.175 | 11.3 | 0.1 | 4.1 | 70% |
| 35 | 0.0155 | 0.175 | 11.3 | 0.5 | 2.8 | 69% |
| 35 | 0.0155 | 0.175 | 11.3 | 0.9 | 2.4 | 71% |
| 35 | 0.0155 | 0.3 | 19.4 | 0.1 | 4.1 | 73% |
| 35 | 0.0155 | 0.3 | 19.4 | 0.5 | 2.8 | 70% |
| 35 | 0.0155 | 0.3 | 19.4 | 0.9 | 2.5 | 73% |
| 35 | 0.0465 | 0.05 | 1.1 | 0.1 | 4.1 | 86% |
| 35 | 0.0465 | 0.05 | 1.1 | 0.5 | 2.8 | 96% |
| 35 | 0.0465 | 0.05 | 1.1 | 0.9 | 2.5 | Failed (separated) |
| 35 | 0.0465 | 0.175 | 3.8 | 0.1 | 4.2 | Gelled, blue |
| 35 | 0.0465 | 0.175 | 3.8 | 0.5 | 2.8 | 91% |
| 35 | 0.0465 | 0.175 | 3.8 | 0.9 | 2.5 | 93% |

TABLE 8-continued

Beverage Syrup Variants, pH, and Color Retention after 6 weeks at 32° C.
(Total Sum of Blue Absorbance)

| Water (wt. %) | Phycocyanin (wt. %) | λ-Carrageenan (wt. %) | Ratio (LC:PC) | Acid (wt. %) | pH | % Color Retention (6 wk 32° C.) |
|---|---|---|---|---|---|---|
| 35 | 0.0465 | 0.3 | 6.5 | 0.1 | 4.1 | Gelled, blue |
| 35 | 0.0465 | 0.3 | 6.5 | 0.5 | 2.8 | 90% |
| 35 | 0.0465 | 0.3 | 6.5 | 0.9 | 2.45 | 91% |
| 35 | 0.0775 | 0.05 | 0.6 | 0.1 | 4.3 | 90% |
| 35 | 0.0775 | 0.05 | 0.6 | 0.5 | 2.9 | Failed (separated) |
| 35 | 0.0775 | 0.05 | 0.6 | 0.9 | 2.5 | Failed (separated) |
| 35 | 0.0775 | 0.175 | 2.3 | 0.1 | 4.2 | Gelled, blue |
| 35 | 0.0775 | 0.175 | 2.3 | 0.5 | 2.8 | 89% |
| 35 | 0.0775 | 0.175 | 2.3 | 0.9 | 2.5 | 89% |
| 35 | 0.0775 | 0.3 | 3.9 | 0.1 | 4.5 | Gelled, blue |
| 35 | 0.0775 | 0.3 | 3.9 | 0.5 | 2.9 | Gelled, blue |
| 35 | 0.0775 | 0.3 | 3.9 | 0.9 | 2.5 | Gelled, blue |

Based upon the results from the study, the general findings were as follows.

1. Color stability was poor when the pH was 3.8 or higher and water content was at 55 and 75 wt. %.
2. Sedimentation or phase separation occurred when the ratio of LC:PC ratio was below 2.0, pH is less than 3.8, and water content was at 55 and 75 wt. %.
3. At 35 wt. % water, good color stability was achieved between pH 2.4 and 4.5. The minimum ratio of LC; PC varied based upon the pH of the solution. As pH increases above 2.9 less carrageenan is needed to stabilize phycocyanin. As pH decreases below 2.9, sedimentation or phase separation will occur when LC:PC ratio is too low.
4. Gelling occurred when phycocyanin, carrageenan and sucrose levels are high and the water level is low. Although gelling is not preferred for a syrup, the improvement of color stability is also present in gelled compositions.

Photometric measurements of gelled samples were not recorded due to high analytical variability. Based upon visual observations, high blue color retention was obtained with the gelled samples.

When the water content is low and viscosity of the solution is high, rate of degradation is low. According to Stokes law, the force required for a particle to move is directly proportional to the viscosity of the solution. It is assumed that for low water solutions, viscosity may be a key factor in stabilizing phycocyanin color stability in combination with multi-sulphated carrageenan.

The preferred pH range in foodstuff where the water content is between 45-80 wt. % is 2 to 3.7, more preferred 2.5-3.5, and most preferred 2.3-3.3. The preferred ratio of LC to PC is between 2:1 and 150:1.

The preferred pH range in a foodstuff where the water content is between 15 and less than 45 wt. % Is 2 to 5. The preferred ratio of LC to PC varies based upon pH. When the pH is between 2 to 2.5, LC to PC ratio is 1.5:1 to 100:1. When pH is above 2.5 to 2.9, LC to PC ratio is between 0.7:1 to 75:1. When pH is above 2.9 to 5, LC to PC ratio is between 0.4:1 to 50:1

Example 4

An experiment was conducted to determine the maximum quantity of non-degraded lambda carrageenan that can be added to various levels of water in the presence of phycocyanin at a pH of less than 3. The amount of water in the solution was controlled by the addition of sucrose. Sucrose could be replaced with invert sugar, fructose, glucose, high fructose corn syrup, or other carbohydrates. While the solubility limits of ingredients in water vary, for simplicity sucrose was used as the proxy for other simple sugars or high potency sweeteners which are commonly used in liquid foodstuffs. For each solution, the citric acid level was fixed at 0.5% (w/w). The phycocyanin level in the various solutions is at an LC:PC weight ratio between 3.8-4.0. To understand the approximate limits of lambda carrageenan in a sucrose, phycocyanin solution at a pH less than 3, visual observation of partial gelling or undissolved particles was used as the key criteria. The maximum carrageenan level per water level at a LC:PC ratio between 3.8-4.0 between pH 2.6-2.8 is in Table 9.

Water content, pH, phycocyanin, and total solid content have an impact to maximum carrageenan levels, the levels below are for general guidance and vary significantly by formulation.

TABLE 9

Maximum non-degraded lambda carrageenan level at various water content in a sucrose phycocyanin solution at pH between 2.6-2.8 and LC:PC ratio between 3.8-4

| Water (wt %) | Lambda Carrageenan (LC) (wt %) | Sucrose (wt %) | Phycocyanin (PC) (wt %) | LC:PC ratio | pH |
|---|---|---|---|---|---|
| 35 | 0.175 | 62 | 0.0465 | 3.8 | 2.8 |
| 55 | 0.3 | 42 | 0.0775 | 3.9 | 2.8 |
| 75 | 0.4 | 24 | 0.1000 | 4.0 | 2.6 |
| 97.5 | 0.5 | 1 | 0.1256 | 4.0 | 2.7 |

Experiment 5

One of the challenges with using carrageenan to stabilize *spirulina* is the increase in viscosity of the solution which has an impact on mixing and flow properties. It has been observed in experiments that the viscosity of a solution containing lambda carrageenan over time is reduced and has same viscosity of a solution with no carrageenan. The reduction in viscosity is due to the hydrolysis of carrageenan in acidic conditions which is well characterized in literature.

The following experiment is to determine whether or not hydrolysis of carrageenan before the addition of *spirulina* will also stabilize *spirulina*.

A 1 wt. % λ-carrageenan solution was prepared using a blender at medium speed for 10 minutes. A portion of the 1 wt. % λ-carrageenan solution was set aside for the control experiment. The remaining solution was acidified to pH 2.5 with citric acid, then placed in a water bath at 80° C. and 100 mL aliquots were removed after 5, 10, 15 and 30 minutes. All samples were cooled to room temperature in a cool water bath. Viscosity measurements were determined as described above with Anton Paar at 20° C. For reference purposes, the viscosity of a 1 wt. % sucrose solution and tap water were measured.

TABLE 10

Viscosity of a non-degraded 1 wt % λ-carrageenan solution and hydrolyzed 1 wt. % λ-carrageenan solution (pH 2.5, 80° C. and various time intervals) before and after pH neutralization

| Sample | Average Viscosity Measurements - 1 wt. % Ticaloid ® 750 hydrolyzed at pH 2.5 at 80° C. | | | |
|---|---|---|---|---|
| | Viscosity [mPas] | | | |
| Non-degraded | 151.5 | | | |

| | Viscosity [mPas] pH 2.5 | Reduction [%] | Viscosity [mPas] - after neutralization | Reduction [%] |
|---|---|---|---|---|
| Hydrolyzed T 0 min | 123.1 | 19 | 93.0 | 39 |
| Hydrolyzed T 5 min | 82.1 | 46 | 65.3 | 57 |
| Hydrolyzed T 10 min | 55.9 | 63 | 42.8 | 72 |
| Hydrolyzed T 15 min | 28.2 | 81 | 21.1 | 86 |
| Hydrolyzed T 30 min | 7.2 | 95 | 5.9 | 96 |
| 1% Sucrose | 1.2 | NA | NA | NA |
| Water | 1.1 | NA | NA | NA |

Viscosity results in table 10 show an immediate reduction of viscosity with the addition of citric acid at pH 2.5. When exposed to heat, there is a significant drop in viscosity, 63% after 10 minutes and rate of viscosity reduction slows between 15 and 30 minutes.

The pH after neutralization was pH 5.5. The viscosity of the solution after neutralization with 2M NaOH solution was also measured and the viscosity decreased slightly due to the increase in water content which results in a lower carrageenan concentration. The viscosity of the solutions did not increase after neutralization which demonstrates that viscosity drop is due to hydrolyzation of multi-sulphated carrageenan and not a function of pH.

Based upon the results, the 10 and 30 minutes 1 wt. % λ-carrageenan hydrolyzed samples were tested in hot fill beverages.

As it is stated in the process description, *spirulina* phycocyanin needs to be stabilized with multi-sulphated carrageenan at pH above 5 before acid or acidic components are added. The acidic 10 and 30 minutes hydrolyzed 1 wt. % λ-carrageenan samples were split and one portion was neutralized to a pH of 8 with 50% NaOH.

A total of five variables were tested in a hot fill beverage application: λ-Carrageenan Control, 10 & 30 minutes Hydrolyzed (acid+heat), and 10 & 30 minutes Hydrolyzed (acid+heat) then Neutralized. The dosage level of the different hydrolyzed λ-carrageenan solutions were adjusted to reach a final concentration of 0.05 wt. % λ-carrageenan in a beverage. The remaining ingredients in the beverage formula were 7 wt % sucrose, 0.5 wt. % EXBERRY® Shade Blue liquid 60000202 (equivalent to 0.0155 wt. % phycocyanin), and citric acid. Level of citric acid was adjusted to reach final beverage pH of 2.9. The five different beverages were thermally processed to 85° C. (microwave) and filled hot into PET bottles and cooled below 35° C. In a water bath.

After thermal processing and 1 week in 32° C. hot box, the control and 10 minutes hydrolyzed+neutralized beverages were clear aqua blue with no precipitation. The 30 minutes hydrolyzed+neutralized beverage was aqua blue with no precipitation but slightly turbid. The 10 and 30 minutes hydrolyzed (acid+heat) were aqua blue but had significant precipitate after 1 week in 32° C. hot box. The samples were stored for 6 weeks in the hot box and measured for color retention. All samples were aqua blue and color loss ranged between 22-29%, however, the hydrolyzed λ-carrageenan solutions that were not neutralized prior to the addition of *spirulina* had significant precipitate (table 11).

TABLE 11

Total Sum of Blue Absorbance after thermal processing and 6 weeks in 32 C hot box

| | Sum of Blue Absorbance | | |
|---|---|---|---|
| | after heat | 6 wks@32° C. | Appearance |
| Lambda Carrageenan Control | 0.5544 | 0.3935 | Clear aqua blue |
| 10 min @ 85° C. hydrolysis (acidic) | 0.4217 | 0.3285 | Turbid aqua blue, precipitate |
| 10 min @ 85° C. hydrolysis (neutralized) | 0.5342 | 0.3964 | Clear aqua blue |
| 30 min @ 85° C. hydrolysis (acidic) | 0.5196 | 0.3724 | Turbid aqua blue, precipitate |
| 30 min @ 85° C. hydrolysis (neutralized) | 0.5556 | 0.4352 | Turbid aqua blue |

Hydrolysis of carrageenan enables an increase in phycocyanin and carrageenan levels as viscosity is reduced.

Example 6

An experiment was conducted to determine if iota carrageenan will perform similarly to lambda carrageenan in a syrup with three different water levels, 35, 50 & 75 wt. %. Syrup formulations had a constant phycocyanin, Iota carrageenan, and citric acid level. The amount of water in the solution was controlled by the addition of sucrose. The phycocyanin level was fixed at 0.0465 wt. %, iota carrageenan at 0.175 wt. % and citric acid level was fixed at 0.5 wt. %.

Phycocyanin content was sourced from EXBERRY® Shade Blue 60000202 at 1.5 wt. % and iota carrageenan was from TIC Ticaloid® 881. All formulations contain 500 ppm potassium sorbate and 500 ppm sodium benzoate to control for yeast, mold, and bacteria as syrups were not thermally processed. Disodium EDTA was used in the concentrated colored solution (syrup) at 30 ppm. The ratio of iota carrageenan (IC) to phycocyanin content (PC) in the various solutions is at an IC:PC weight ratio of 3.76.

Syrups were stored in 32° C. hotbox and measured for color retention at time zero and after 6 weeks of accelerated storage. Syrups were diluted 1 part concentrate to 2 parts distilled water to ensure absorbance was less than 1.2 in the visible range of the spectrophotometer.

Table 12 lists each variant, the measured pH, color retention after 6 weeks at 32° C., and notation if syrup failed due to sedimentation or gelling.

TABLE 12

Beverage Syrup Variants with Iota Carrageenan and Color Retention after 6 weeks at 32° C. (Total Sum of Blue Absorbance)

| Water (wt. %) | Phycocyanin (wt. %) | iota-Carrageenan (wt. %) | Ratio (IC:PC) | Acid (wt. %) | pH | % Color Retention (6 wk 32° C.) |
|---|---|---|---|---|---|---|
| 35 | 0.0465 | 0.175 | 3.76 | 0.5 | 2.7 | 79% |
| 50 | 0.0465 | 0.175 | 3.76 | 0.5 | 2.7 | 81% |
| 75 | 0.0465 | 0.175 | 3.76 | 0.5 | 2.7 | 81% |

Color retention with Iota Carrageenan is similar to results seen in example 3.2 with lambda carrageenan.

Example 7

An experiment was conducted to determine if hydrolysis of lambda carrageenan prior to combination with phycocyanin from *spirulina* extract will impact the stabilization of the blue color in a syrup. Three preparations of a dilute lambda carrageenan solution (control, hydrolyzed (acid+heat), and hydrolyzed then neutralized) were made and added to cold fill preserved syrup comprised of 55 wt. % water, about 24.7 w/w % sucrose, 0.05 wt. % sodium benzoate, 0.05% potassium sorbate, 0.003 wt. % calcium disodium EDTA, and 1.5 wt. % *spirulina* extract from EXBERRY Shade Blue liquid 60000202. The lambda carrageenan solutions were added at about 17.5 wt. % to deliver a 0.175 wt. % of lambda carrageenan in the syrup. Due to the addition of acid and/or base in the carrageenan solutions, the final concentration of lambda carrageen was 0.994 wt. % hydrolyzed (acid+heat) and 0.987 wt. % hydrolyzed+neutralized. The amount carrageenan solution for the three experiments was adjusted to deliver a final lambda carrageenan concentration of 0.175 wt. % In the syrup and the sucrose level in the syrup was adjusted accordingly. The three syrup formulations (control, hydrolyzed (acid+heat), and hydrolyzed+neutralized) had a constant phycocyanin (0.0465 wt. %), water, preservative, and lambda carrageenan level. Citric acid levels were adjusted to reach a final syrup pH of 2.5.

Ticaloid 750 from TIC was used as the lambda carrageenan source and was hydrated in water at a 1 wt % concentration using a blender and mixing at medium speed for 10 minutes. A portion of the solution was retained and used for the control experiment. The remaining solution was acidified to pH 2.5 with citric acid and heated in a water bath at 85° C. for 10 minutes. A portion of the solution was reserved for use in the hydrolyzed (acid+heat) experiment. The remaining solution was cooled to room temperature and 50% NaOH was added to neutralize the solution to pH 8. The final solution was used in the hydrolyzed+neutralized experiment.

After the syrups were prepared, it was observed that the control and hydrolyzed+neutralized syrups were clear, and dark blue, while the hydrolyzed (acid+heat) syrup was turbid. After aging the samples for 1 week in a 32 C hotbox the control and hydrolyzed+neutralized syrups remained clear and dark blue while a significant amount of blue precipitate was observed in the hydrolyzed (acidic) sample.

Example 8

Starch based fruit gummies/jellies were colored with *spirulina* extract with and without lambda carrageenan. The formula for the starch based gum/jelly is listed in table 13 and was prepared by dissolving modified starch into cold water until fully dissolved. Sucrose, glucose syrup and sorbitol are added and solution is heated between 50-60° C. to dissolve all the sugars. The starch sugar solution is cooked in a pressure cooker until temperature reaches 138° C. The solution is removed from the pressure cooker and cooled to 100° C. prior to the addition *spirulina* extract either directly or in a *spirulina* lambda carrageenan solution. After the addition of *spirulina* color, citric acid is added to adjust pH to 3.5. The brix of the fruit gummy is between 73-75° Bx.

With the control formula, *spirulina* extract was added directly at a dosage level of 0.8 wt. % resulting in a phycocyanin content of 0.0248 wt. % in the fruit gum. With the lambda carrageenan variant, a 1 wt. % solution of lambda carrageenan (Cargill) was prepared by dissolving lambda carrageenan in water using a blender for 10 minutes. *Spirulina* extract was added to the 1 wt. % lambda carrageenan solution at a weight ratio of 20 wt. % *spirulina* extract and 80 wt. % 1 wt. % lambda carrageenan solution. The resulting color solution has a total phycocyanin content of 0.62 wt. %, lambda carrageenan content of 0.8 wt. % and LC to PC ratio of 1.3:1. The carrageenan *spirulina* solution was added to the hot starch mass at a dosage level of 4 wt. % to deliver the same amount of phycocyanin content of 0.0248 wt. % as in the control fruit gummy.

After the color and acid are mixed with the starch sugar solution, part of the colored hot mass was immediately deposited in starch molds. The remaining colored hot mass was held at 100° C. for 10 minutes and then deposited in starch molds. The colored starch gums dried in molds for a minimum of 48 hours before removed and de-starched. Colorimeter measurements were taken of the gummies with DigiEye Color Measurement and Imaging System. Verivide. UK. The camera is calibrated and light box is white balanced based upon manufacturer instructions. Colors are calculated according to 10° Observer and D65 Illuminant for all measurements. Color information is expressed as L*a*b* values. L*a*b* measurements and calculated ΔE values are listed in table 14.

TABLE 13

Starch Gum/Jelly Colorless Base Formulation

| Ingredient | Weight per batch [g] | Dosage [wt. %] |
|---|---|---|
| Sucrose | 1330.00 | 35.06 |
| Glucose syrup (DE 42) | 1181.25 | 31.14 |
| Modified Starch | 488.25 | 12.87 |
| Sorbitol powder | 112.00 | 2.95 |
| Water | 682.15 | 17.98 |
| Total | 3793.65 | 100.00 |

TABLE 14

L*a*b* values measured by DigiEye for spirulina colored starch fruit gums where hot mass is held for 0 and 10 minutes

| | Holding time: 0 min | | | | Holding time: 10 min @ 100° C. | | | | ΔE 10 min vs. 0 time |
|---|---|---|---|---|---|---|---|---|---|
| | L* | a* | b* | Comment | L* | a* | b* | Comment | |
| Control: Spirulina extract | 54.74 | −37.15 | −14.20 | No difference between samples | 52.82 | −20.32 | −0.83 | Significant color loss | 21.58 |
| Variant: Spirulina extract/ Lambda Carrageenan Solution | 54.33 | −37.31 | −14.07 | | 51.68 | −33.73 | −12.41 | Slight color loss | 4.75 |

The control and variant *spirulina* colored fruit gums deposited with no holding time have a similar blue color hue. There was a significant loss of color with the control fruit gums that were subject to a 10 minute hold at 100° C. The ΔE difference between the control 0 and 10 minute hold samples was 21.58 which is a numerical indication of significant color difference. With the variant fruit gums, carrageenan had a protective effect for *spirulina* as the resulting fruit gums were still blue after a 10 minute hold at 100° C. The ΔE difference between the variant 0 and 10 minute hold samples was 4.75 which indicates minimal color difference.

Example 9

Fruit preparation for use in yogurt applications were prepared with *spirulina* extract with and without lambda carrageenan. Formulas for the fruit preps are listed in table 15.

TABLE 15

Fruit Preparation formulations colored with spirulina

| Ingredient | [g] | [%] |
|---|---|---|
| CONTROL | | |
| Water, filtered | 120.74 | 60.37 |
| Sugar, white, granular | 66 | 33 |
| Corn Starch, Novation Prima 300 | 8 | 4 |
| Citric acid, granular | 0.06 | 0.03 |
| Pectin, TIC Gums HM Slow Set 3 | 1.2 | 0.6 |
| EXBERRY ® Shade Blue 60000202 | 4 | 2 |
| TOTAL | 200 | 100 |
| LAMBDA | | |
| Water, filtered | 121.18 | 60.59 |
| Sugar, white, granular | 66.04 | 33.02 |
| Corn Starch, Novation Prima 300 | 8 | 4 |
| Carrageenan, TIC 750 | 0.6 | 0.3 |
| EXBERRY ® Shade Blue 60000202 | 4 | 2 |
| Citric acid, granular | 0.18 | 0.09 |
| TOTAL | 200 | 100 |

Fruit preparation is prepared as follows, dry blend sugar, corn starch, and hydrocolloid (either pectin or lambda carrageenan). Add water while mixing for 2 minutes. Turn on heat for Thermomix® (electric mixer, cooker) up to 93° C. for 18 minutes with constant agitation. Reduce heat and add *spirulina* color at a dosage level of 2 wt. % and resulting phycocyanin level of 0.062% when the temperature reaches 90° C. Add citric acid to reach a pH of 3.3 and continue to cook and mix at 90° C. for 3 minutes. After 3 minutes, the fruit preparation, is poured into a container and cooled to room temperature. The Brix of the fruit preparation is 47.3° Bx.

The lambda carrageenan variant has a carrageenan content of 0.3 wt. %, phycocyanin content of 0.062 wt. %, and LC:PC ratio of 4.8. The control variant has the same phycocyanin content but no lambda carrageenan.

Visual observation of the fruit prep after thermal processing is that the control and variant are both blue, however the variant was a darker blue. Fruit preparations were added to a 2% milkfat yogurt at dosage rate of 15 w % in two ways: fruit on the bottom and stirred yogurt. With both applications, the yogurts will filled and sealed and stored in refrigerated dairy case with constant light exposure for 28 days. At the end of the study, the color of the control samples faded to a light blue green color while the variants with carrageenan remained blue.

This invention is of significant importance as phycocyanin containing *spirulina*-extract has limited use in beverage concentrates, flavored syrups, smoothies, gummies, jams, fruit preparation and other food and beverage products due to protein aggregation and/or color fading. The addition of multi-sulphated carrageenans with or without EDTA in an optimized formulation matrix and correct order of addition can enable *spirulina*-extracts to be used in a wide range of foods.

Multiple ingredients have been screened to determine whether they have a positive or negative impact on *spirulina* protein aggregation and color retention in a high acid ready to drink beverage. Table 16 is a summary of ingredients that were evaluated prior to the discovery of hydrocolloids and chelators.

TABLE 16

Impact of Ingredients to Spirulina color concentrate

| Attribute | Range/Types Tested | Aggregation | Color Stability |
|---|---|---|---|
| Anti-oxidants | Vitamin C | Neutral | Browning |
| | Rosemary Extract | <25 ppm okay | Shifts to Green |
| | Grape Seed Extract | <10 ppm okay | Shifts to Green |
| | | <75 ppm okay | No Improvement |
| | Glutathione | <10 ppm okay | No Improvement |
| | Quercetin | | |

TABLE 16-continued

Impact of Ingredients to Spirulina color concentrate

| Attribute | Range/Types Tested | Aggregation | Color Stability |
|---|---|---|---|
| Poly-phenols | Green Tea Extract (5-95% EGCG) | <25 ppm okay | Shifts to Green |
| | Green Coffee Bean (Chlorogenic Acid) | <250 ppm okay | No Improvement |
| Protein | Whey Protein | 0.2% @ pH ≤ 3.5 | No improvements |
| | Potato Protein | 0.1-0.3% @ pH ≤ 3.5 | Better at lowest level |

From the screening work, it is clear that multiple ingredients can destabilize *spirulina* protein and in particular phycocyanin. Ingredients such as antioxidants and polyphenols had either a negative or neutral impact on *spirulina* concentrate.

Given the significant hurdles associated with formulating with *spirulina* concentrates, it was surprising that multi-sulphated carrageenan and/or combination with a chelator significantly improves stability of *spirulina* phycocyanin.

What is claimed is:

1. A foodstuff, comprising:
  a. a *spirulina*-extract comprising phycocyanin,
  b. at least one multi-sulphated carrageenan and
  c. water,
  wherein the amount of the at least one multi-sulphated carrageenan is between 0.006 and 0.6 wt. %,
  wherein the amount of the phycocyanin ranges between 0.003 and 0.5 wt. %,
  wherein the amount of the water ranges between 45 and 80 wt. %,
  and wherein
  d. the weight ratio between the at least one multi-sulphated carrageenan and the phycocyanin ranges between 2:1 and 150:1, and the pH of the foodstuff ranges between 2.0-3.7,
  wherein the foodstuff is free of polyphenols,
  wherein the foodstuff has a stable color for six weeks or more at 32° C., and
  wherein the wt. % are relative to the total weight of the foodstuff.

2. The foodstuff according to claim 1, wherein the foodstuff contains between 85 and 20 wt. % of carbohydrates.

3. The liquid foodstuff foodstuff according to claim 1, wherein the total phycocyanin content (which is the sum of the C-phycocyanin and allophycocyanin) ranges from 0.007-0.4 wt. %.

4. The composition according to claim 1, wherein the at least one multi-sulphated carrageenan is a non-degraded carrageenan.

5. The composition according to claim 1, wherein the at least one multi-sulphated carrageenan is a hydrolyzed multi-sulphated carrageenan.

6. The foodstuff according to claim 1, wherein the at least one multi-sulphated carrageenans is selected from the group consisting of ιI-carrageenan, δ-carrageenan, μ-carrageenan, θ-carrageenan, λ-carrageenan and ν-carrageenan, a hydrolysed product of ι-carrageenan, a hydrolysed product of δ-carrageenan, a hydrolysed product of μ-carrageenan, a hydrolysed product of θ-carrageenan, a hydrolysed product of λ-carrageenan and a hydrolysed product of ν-carrageenan.

7. The foodstuff according to claim 1, wherein a chelating agent is present.

8. The foodstuff according to claim 1, wherein a chelating agent is present and wherein the chelating agent is selected from the group consisting of ethylene diamine tetra acetic acid and/or its Na, K, Ca salts (EDTA) and L-glutamic acid N,N-diacetic acid tetrasodium salt (GLDA).

9. The foodstuff according to claim 7, wherein the chelating agent is present between 1-2000 ppm in the foodstuff.

10. The foodstuff according to claim 7, wherein the ethylene diamine tetra acetic acid is present as chelating agent in a range between 10-300 ppm.

11. The foodstuff according to claim 7, wherein the ethylene diamine tetra acetic acid and the phycocyanin from a *spirulina*-extract are present within the foodstuff at a weight ratio between 4:1-1:200.

12. The foodstuff according to claim 1, wherein the at least one multi-sulphated carrageenan is selected from the group consisting of ι-carrageenan, λ-carrageenan, a hydrolyzed product of ι-carrageenan, and a hydrolyzed product of λ-carrageenan.

13. The foodstuff according to claim 1, wherein the at least one multi-sulphated carrageenan is selected from the group consisting of λ-carrageenan and hydrolyzed product of λ-carrageenan.

14. A foodstuff, comprising:
  a. a *spirulina*-extract comprising phycocyanin,
  b. at least one multi-sulphated carrageenan and
  c. water,
  wherein the amount of the at least one multi-sulphated carrageenan is between 0.006 and 0.6 wt. %,
  wherein the amount of the phycocyanin ranges between 0.003 and 0.5 wt. %,
  wherein the amount of the water ranges between 15 and less than 45 wt. %,
  and wherein
  d. i. the weight ratio between the at least one multi-sulphated carrageenan and the phycocyanin ranges between 1.5:1 and 100:1 at a pH of the foodstuff which is at least 2 and less than 2.5,
     ii. the weight ratio between the at least one multi-sulphated carrageenan and the phycocyanin ranges between 0.7:1 and 75:1 at a pH of the foodstuff which is at least 2.5 and less than 2.9, and
  wherein the foodstuff is free of polyphenols,
  wherein the foodstuff has a stable color for six weeks or more at 32° C., and
  wherein the wt. % are relative to the total weight of the foodstuff.

15. A foodstuff, comprising:
  a. a *spirulina*-extract comprising phycocyanin,
  b. at least one multi-sulphated carrageenan and
  c. water,
  wherein the amount of the at least one multi-sulphated carrageenan is between 0.006 and 0.6 wt. %,
  wherein the amount of the phycocyanin ranges between 0.003 and 0.5 wt. %,
  wherein the amount of the water ranges between 15 and less than 45 wt. %,
  and wherein
  d. the weight ratio between the at least one multi-sulphated carrageenan and the phycocyanin ranges between 0.4:1 and 50:1 at a pH of the foodstuff which is at least 2.9 and less than 5,
  wherein the foodstuff is free of polyphenols,
  wherein the foodstuff has a stable color for six weeks or more at 32° C, and wherein the wt. % are relative to the total weight of the foodstuff.

\* \* \* \* \*